(12) United States Patent
Baba (10) Patent No.: US 7,508,105 B2
(45) Date of Patent: Mar. 24, 2009

(54) MAGNETO-GENERATOR (75) Inventor: Shinji Baba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 565 days.

(21) Appl. No.: 10/227,426

(22) Filed: Aug. 26, 2002

(65) Prior Publication Data
US 2003/0197442 A1    Oct. 23, 2003

(30) Foreign Application Priority Data
Apr. 22, 2002   (JP)   ............... 2002-119525

(51) Int. Cl.
H02K 21/12    (2006.01)
(52) U.S. Cl. .............. 310/156.12; 310/74; 310/153
(58) Field of Classification Search ........... 310/152, 310/154.36, 154.06, 153, 156, 74, 156.12, 310/156.13, 156.28
See application file for complete search history.

(56) References Cited

U.S. PATENT DOCUMENTS

| | | | |
|---|---|---|---|
| 4,115,716 A * | 9/1978 | Ogasawala et al. | 310/153 |
| 4,419,414 A * | 12/1983 | Fischer et al. | 428/575 |
| 4,625,392 A * | 12/1986 | Stokes | 29/598 |
| 4,701,654 A * | 10/1987 | Tatukawa et al. | 310/153 |
| 4,757,603 A * | 7/1988 | Stokes | 29/598 |
| 4,877,986 A * | 10/1989 | Shimizu | 310/153 |
| 6,339,274 B1 * | 1/2002 | Mobius et al. | 310/156.28 |
| 6,614,140 B2 * | 9/2003 | Uemura et al. | 310/153 |

FOREIGN PATENT DOCUMENTS

| | | | |
|---|---|---|---|
| JP | 62119180 A * | 5/1987 | |
| JP | 62-119180 | 7/1987 | |
| JP | 63-287348 | 11/1988 | |
| JP | 63265555 A * | 11/1988 | |
| JP | 63287348 A * | 11/1988 | |
| JP | 01099448 A * | 4/1989 | |
| JP | 10-145995 A | 5/1998 | |
| JP | 10145995 A * | 5/1998 | |
| JP | 2000037054 A * | 2/2000 | |
| JP | 2003111325 A * | 4/2003 | |

* cited by examiner

*Primary Examiner*—Dang D Le
(74) *Attorney, Agent, or Firm*—Sughrue Mion, PLLC (57) ABSTRACT

A magneto-generator includes a bowl-shaped flywheel and plural magnets disposed internally of the flywheel. A guard ring of a cylindrical shape is disposed in intimate contact with the plural magnets. The guard ring is provided with retaining portions formed at a bottom side of the flywheel and a discontinuous flange portion formed at the side opposite to the retaining portions. The magnets are positioned fixedly, being sandwiched between the retaining portions and the discontinuous flange portion. A space formed between the flywheel and the guard ring is filled with resin for securing the magnets integrally with the flywheel. A generator coil is disposed internally of the flywheel in opposition to the magnets for electromagnetically generating electricity. The guard ring is of a thin structure, ensuring high efficiency for the generation of electricity.

2 Claims, 5 Drawing Sheets

MAGNETO-GENERATOR

BACKGROUND OF THE INVENTION

1. Field of the Invention

The present invention generally relates to a magneto-generator (also known as the magnetoelectric generator) for generating electric energy or electricity under the action of electromagnetic induction taking place between magnets mounted on a flywheel and an armature winding during rotation of the flywheel. More particularly, the present invention is concerned with an improved structure of a guard annulus or ring which is employed for protecting and positioning a plurality of magnets mounted on an inner peripheral surface of the flywheel.

2. Description of Related Art

Figure 7:
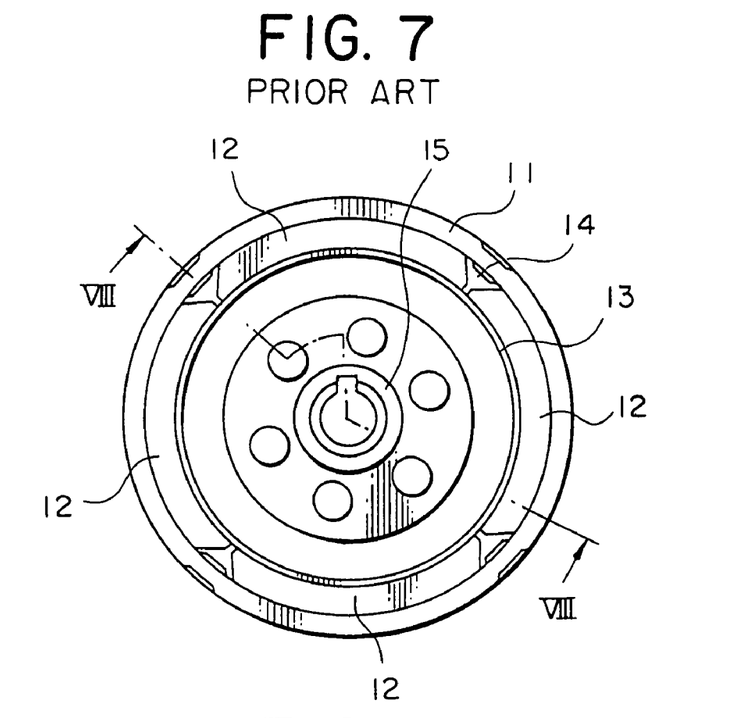
FIG. 7 is a front view of a rotor of a conventional flywheel type magneto-generator.
Figure 8:
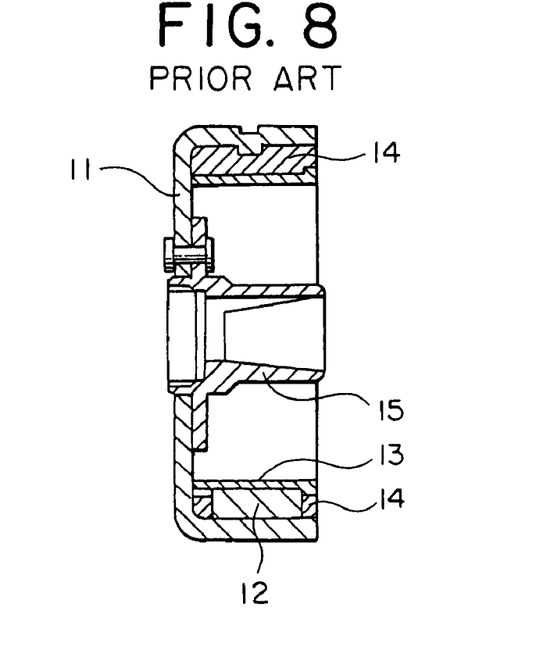
FIG. 8 is a sectional view of the same taken along the line VIII-VIII shown in FIG. 7 and viewed in the direction indicated by arrows.

For having better understanding of the concept underlying the present invention, description will first be made of a conventional flywheel type magneto-generator by reference to FIGS. 7 and 8 of the accompanying drawings, in which FIG. 7 is a front view of a rotor of a conventional flywheel type magneto-generator which is disclosed, for example, in Japanese Patent Publication No. 81437/1994 (JP-A-6-81437), and FIG. 8 is a section view of the same taken along the line VIII-VIII shown in FIG. 7 and viewed in the direction indicated by arrows. Referring to the figures, a rotor of the magneto-generator includes a flywheel 11 implemented in a substantially bowl-like shape (hereinafter also referred to as the bowl-shaped flywheel only for the convenience of description). On the inner peripheral wall of the flywheel 11, four magnets 12 each having an arcuate cross-section are fixedly mounted with equidistance between adjacent ones in the circumferential direction. A guard annulus or ring 13 of a substantially cylindrical shape is tightly or closely fit onto the inner surfaces of the magnets 12 which are disposed in a substantially annular array. Further, resin 14 is filled at both sides and between the adjacent ones of the magnets 12 for fixedly securing the magnets 12 and the guard ring 13 integrally to the flywheel 11. Furthermore, a hub or boss 15 is formed in the flywheel 11 at a center portion of the bottom wall thereof for coupling the rotor to a rotatable shaft (not shown).

In the rotor of the conventional magneto-generator implemented in the structure described above, the four magnets 12 are disposed with equidistance therebetween on the inner peripheral surface of the flywheel 11 with the guard ring 13 of the cylindrical shape being tightly fit onto the magnets 12 on the inner side thereof, wherein the voids or spaces defined between the inner peripheral surface of the flywheel 11 and the outer peripheral surface of the guard ring 13 are filled with the resin 14. In this manner, the magnets 12 and the guard ring 13 are fixedly secured to the flywheel 11 by the resin 14. The guard ring 13 is provided for the purpose of protecting the plurality of magnets 12 mounted on the inner peripheral wall of the flywheel 1 from being injured when these magnets 12 strike against other objects under the magnetic force upon handling of the rotor.

Figure 9:
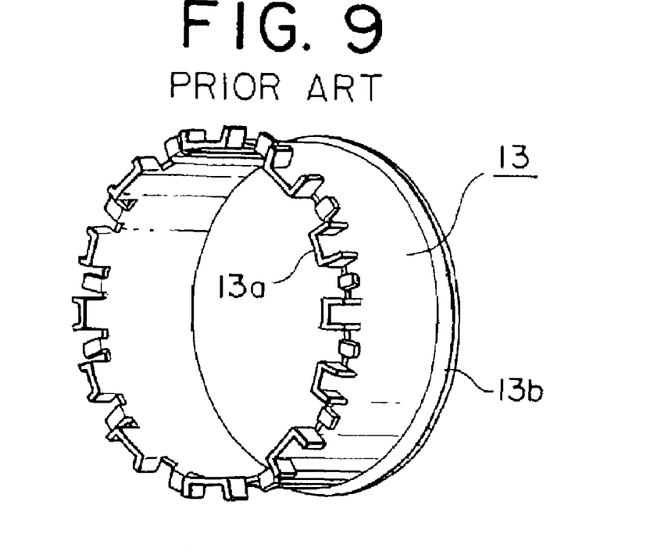
FIG. 9 is a perspective view showing another example of the guard ring employed in a conventional magneto-generator.
Figure 10:
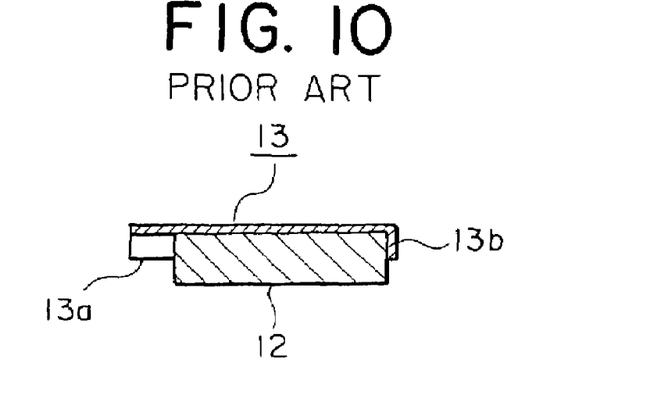
FIG. 10 is a perspective view showing the state in which magnets are disposed on the guard ring shown in FIG. 9.

FIG. 9 is a perspective view showing another example of the guard ring employed in the conventional magneto-generator, and FIG. 10 shows the same partially in section in the state in which magnets are disposed on the guard ring shown in FIG. 9. As can easily be seen in FIG. 9, the guard ring 13 shown in this figure is designed to be employed in the magneto-generator in which a large number of magnets 12 are used with the width thereof in the circumferential direction being reduced when compared with the rotor shown in FIG. 8. As can be seen in FIGS. 9 and 10, the guard ring 13 is generally of a cylindrical shape and formed with a plurality of retaining portions 13a each having a substantially C-like section with equidistance therebetween in and along an opened peripheral edge portion of the ring 13 located at the bottom side of the flywheel 11. On the other hand, formed in the opened peripheral edge portion located oppositely to the retaining portions 13a is a flange 13b. The inner peripheral surface of the guard ring 13 serves for positioning the magnets 12 in the radial direction, while the positions of the magnets 12 in the rotational axis direction (i.e., in the direction along the axis of the rotatable shaft (not shown)) are fixed or delimited by the retaining portions 13a and the flange 13b between which the magnets 12 are sandwiched, as can clearly be seen in FIG. 10.

The guard ring 13 can be manufactured by punching a non-magnetic sheet material such as, for example, a stainless sheet into a predetermined shape or pattern by means of a pressing machine, forming the retaining portions 13a each of C-like cross-section by cutting and bending one end portion while forming the flange 13b by bending vertically the other edge portion. Subsequently, the steel sheet is rounded into a body of cylindrical shape, whereon the abutting end portions of the sheet rounded cylindrically are joined together by welding.

In the magneto-generator of the structure described above, an annular generator coil (not shown) is disposed internally of the flywheel 11 around the boss 15. In other words, the generator coil is so disposed as to face toward the annular array of the magnets 12 with the guard ring 13 being interposed therebetween. In operation, magnetic fluxes emanating from the magnets 12 run through the iron core of the generator coil, whereby electricity is generated.

However, the conventional magneto-generator of the structure described above suffers a problem that due to interposition of a thick wall portion of the guard ring 13 between the magnet array (12) and the generator coil, the air gap defined between the magnet array and the generator coil is effectively enlarged when the rotor rotates around the outer periphery of the generator coil (not shown) because the guard ring 13 is made of a non-magnetic material, as mentioned previously. As a result of this, efficiency or effectiveness of the magnetic fluxes emanating from the magnet array (12) and running through the iron core of the generator coil becomes lowered, incurring degradation in the efficiency of electricity generation of the magneto-motor.

Figure 11:
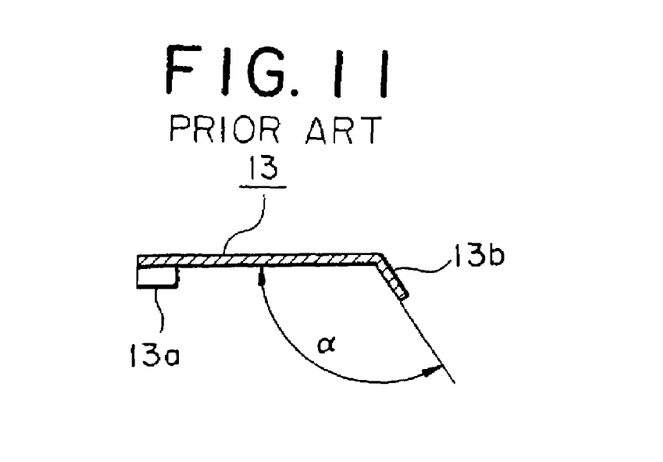
FIG. 11 is a view showing partially in section a guard ring in the conventional magneto-generator for illustrating in what manner a flange portion of the guard ring is deformed outwardly.

Certainly, the problem mentioned above can be coped with to certain extent by employing the thin guard ring 13. In that case, however, another problem may arise that the flange 13b which should intrinsically extend radially outwardly at 90 degrees relative to the rotational axis is likely to be bent at an angle a greater than 90 degrees, as illustrated in FIG. 11, or undergo undesired deformation such as corrugation, which makes it difficult or practically impossible to position correctly and positively the magnet array (12) in a satisfactory manner.

SUMMARY OF THE INVENTION

In the light of the state of the art described above, it is an object of the present invention to provide a magneto-generator in which deformation of a flange portion of a guard ring employed in the magneto-generator can satisfactorily be suppressed even when the guard ring is formed in a thin structure (i.e., in a reduced thickness) so that the generation of electricity can be performed with high efficiency without suffering degradation.

In view of the above and other objects which will become apparent as the description proceeds, there is provided according to a general aspect of the present invention a magneto-generator which includes a flywheel implemented substantially in a bowl-like shape, a plurality of magnets disposed on and along inner peripheral surface of the flywheel, and a guard ring which is formed substantially in a cylindrical shape and disposed in intimate or close contact with the plurality of magnets at inner side surfaces thereof. The guard ring is provided with retaining portions formed in an opened peripheral edge portion located at a bottom side of the flywheel with a flange portion being formed discontinuously in an opened peripheral edge portion of the guard ring located at a side opposite to the retaining portions. The positions of the magnets in a radial direction are delimited by the inner peripheral surface of the flywheel and the outer peripheral surface of the guard ring while the positions of the magnets in the rotational axis direction are delimited by the discontinuous flange portion and the retaining portions, respectively, of the guard ring. Further, resin is filled between the inner peripheral surface of the flywheel and the outer peripheral surface of the guard ring around the individual magnets to secure fixedly the magnets integrally with the flywheel. The magneto-generator further includes a generator coil which is disposed internally of the flywheel in opposition to the magnets. Electricity is generated under the action of electromagnetic induction taking place between the magnets and the generator coil.

By virtue of the structure of the magneto-generator described above, deformation of the guard ring formed in a reduced thickness can satisfactorily be suppressed owing to the provision of the discontinuous flange portions. Thus, the magnets can correctly be mounted and positioned at the respective proper portions. Besides, since the guard ring can be implemented in a thinner structure when compared with the conventional magneto-generator, the air gap between the magnet array and the generator coil can be decreased, as a result of which the magnetic fluxes can run through the iron core of the generator coil with high efficiency, which in turn means that the magneto-generator can enjoy enhanced efficiency of generation of electricity.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings. In the following description, like reference characters designate like or corresponding parts throughout the several views.

Embodiment 1

Figure 1:
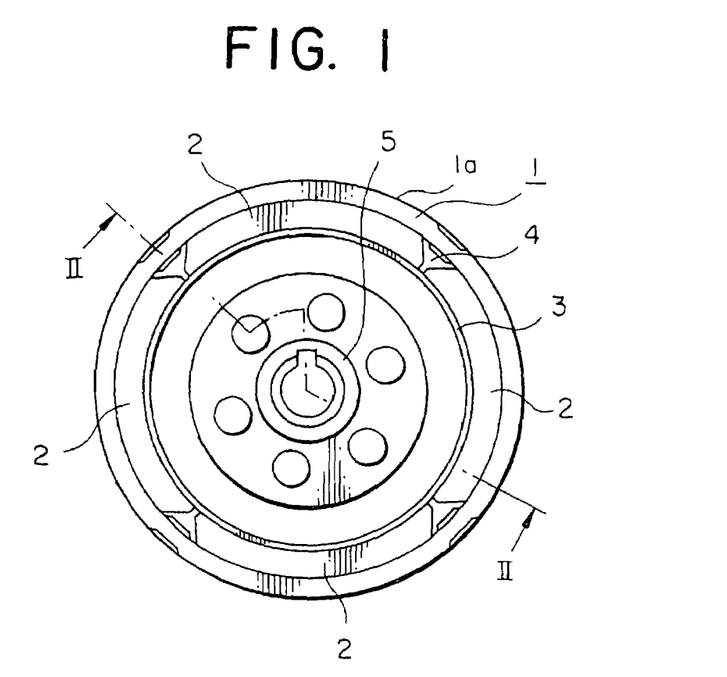
FIG. 1 is a front view showing generally and schematically a structure of a rotor of a magneto-generator according to a first embodiment of the invention.
Figure 2:
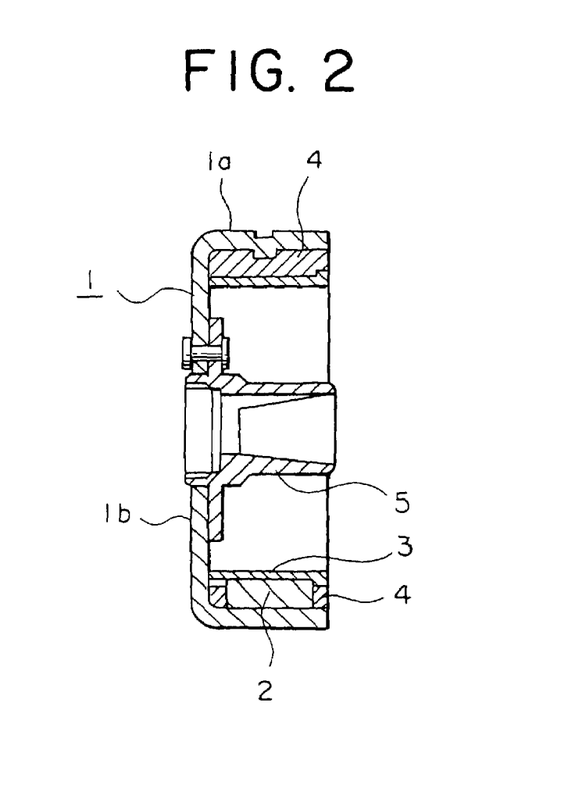
FIG. 2 is a sectional view of the same taken along the line II-II shown in FIG. 1 and viewed in the direction indicated by arrows.
Figure 3:
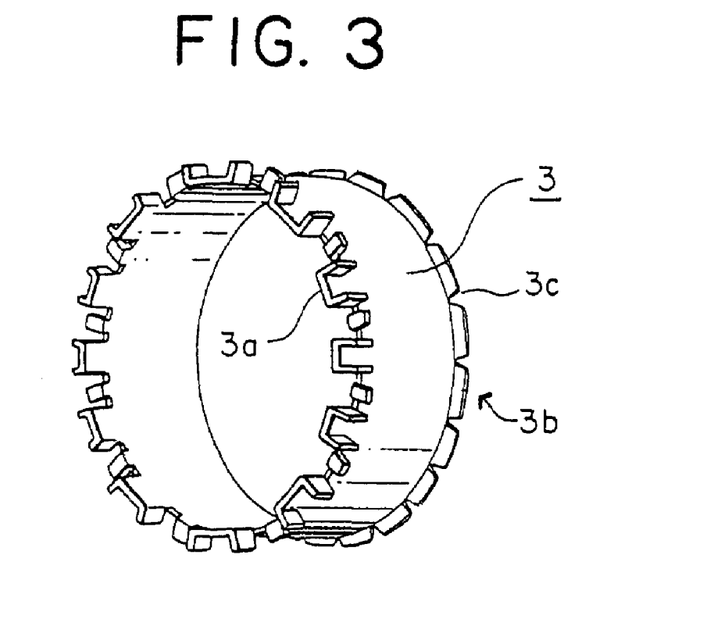
FIG. 3 is a perspective view showing a guard ring constituting a part of the rotor shown in FIG. 1.

FIG. 1 is a front view showing generally and schematically a rotor of a magneto-generator according to a first embodiment of the present invention. FIG. 2 is a sectional view of the same taken along the line II-II shown in FIG. 1 and viewed in the direction indicated by arrows. Further, FIG. 3 is a perspective view showing a guard ring constituting a part of the rotor shown in FIG. 1. As can be seen in these figures, the rotor of the magneto-generator according to the instant embodiment of the invention includes a bowl-shaped flywheel 1 which is composed of a cylindrical peripheral wall 1a and a bottom portion 1b formed integrally at one side of the cylindrical peripheral wall 1a. Formed at a center of the bottom portion 1b of the flywheel 1 is a hub or boss 5 which is employed for mounting the rotor onto a rotatable shaft such as e.g. a crank shaft (not shown) of an internal combustion engine (not shown either). Further, four magnets 2 each of an elongated arcuate shape are disposed on and along the inner peripheral surface of the cylindrical peripheral wall 1a of the flywheel 1 in the form of an annular magnet array as viewed in the circumferential direction and disposed at predetermined positions, respectively, as viewed in the longitudinal direction of the rotatable shaft (also referred to as the rotational axis direction only for convenience of description).

The guard ring 3 for supporting the individual magnets 2 disposed fixedly on and along the inner peripheral surface of the cylindrical peripheral wall 1a of the flywheel 1 in the form of the annular magnet array in the circumferential direction is formed substantially in a cylindrical shape and disposed tightly in close contact with the magnets 2 at the inner side surfaces thereof. An annular space defined between the guard ring 3 and the inner peripheral wall 1a of the flywheel 1 is filled with resin so as to embed the magnets 2 therein. In other words, the resin is filled between the adjacent magnets 2 and at both sides of the individual magnets 2.

As is shown in FIG. 3, the guard ring 3 is formed substantially cylindrically, wherein the opened peripheral edge portion of the guard ring 3 located on the bottom side 1b of the flywheel 1 is formed with a plurality of retaining portions 3a each of a substantially C-like cross-section with equal distance therebetween over the whole circumference of the opened peripheral edge portion. On the other hand, the opened peripheral edge portion located in opposition to the retaining portions 3a is formed with a discontinuous flange portion 3b. The discontinuous flange portion 3b is provided with a plurality of notches 3c with substantially equal distance therebetween in the circumferential direction. These notches 3c can be formed previously when the guard ring 3 is formed by punching a steel sheet into a predetermined shape or pattern by means of a pressing machine. More specifically, each of the notches 3c is so formed that the flange portion is cut away in a triangular form pointing toward an inner peripheral edge of the flange from an outer peripheral edge thereof. By forming the notches 3c in this manner, the discontinuous flange portion 3b is protected from deformation such as bending at an angle greater than 90 degrees, corrugation and the like when the guard ring 3 is rounded into the cylindrical shape. Of course, the guard ring 3 serves for positioning the magnets 2 in the radial direction with the outer peripheral surfaces thereof while the positioning of the magnets 2 in the rotational axis direction (i.e., in the axial direction of the rotatable shaft) is properly realized through cooperation of the retaining portions 3a and the discontinuous flange portion 3b by sandwiching the magnets 2 therebetween, as described hereinbefore in conjunction with the conventional magneto-generator.

As is apparent from the foregoing description, the magneto-generator according to the instant embodiment of the present invention is comprised of the flywheel 1 formed substantially in the bowl-like shape, a plurality of magnets 2 disposed on and along the inner peripheral surfaces of the flywheel 1, and the guard ring 3 which is formed substantially in a cylindrical shape and disposed in close contact with the plurality of magnets 2 on the inner side surfaces thereof. The guard ring 3 is provided with the retaining portions 3a formed in the opened peripheral edge portion located on the bottom side 1b of the flywheel 1 while the flange portion 3b is formed discontinuously in the opened peripheral edge portion of the guard ring 3 at the side opposite to the retaining portions 3a, whereby the magnets 2 are positioned in the radial direction with the inner peripheral surfaces of the guard ring 3 while in the rotational axis direction, the magnets 2 are positioned, being sandwiched between the discontinuous flange portion 3b and the retaining portions 3a, respectively. Further, the resin 4 is filled around the individual magnets 2 between the inner peripheral surface of the flywheel 1 and the outer peripheral surface of the annular guard ring 3 to thereby secure fixedly the magnets 2 integrally with the flywheel 1. The magneto-generator further includes the generator coil which is disposed internally of the flywheel 1 in opposition to the magnets 2. The electricity is generated under the action of the electromagnetic induction taking place between the magnets 2 and the generator coil.

By virtue of the structure of the magneto-generator described above, the guard ring 3 can be implemented in a reduced thickness (i.e., in a thin structure) without bringing about substantially any appreciable deformation of the discontinuous flange portion 3b. By employing the thin guard ring 3, the air gap defined between the magnets 2 and the generator coil can be diminished, whereby the magnetic flux leakage can effectively be suppressed. Thus, the magnetic fluxes can run through the iron core of the generator coil with enhanced efficiency, which contributes to improvement of the efficiency of electricity generation of the magneto-generator.

Embodiment 2

Figure 4:
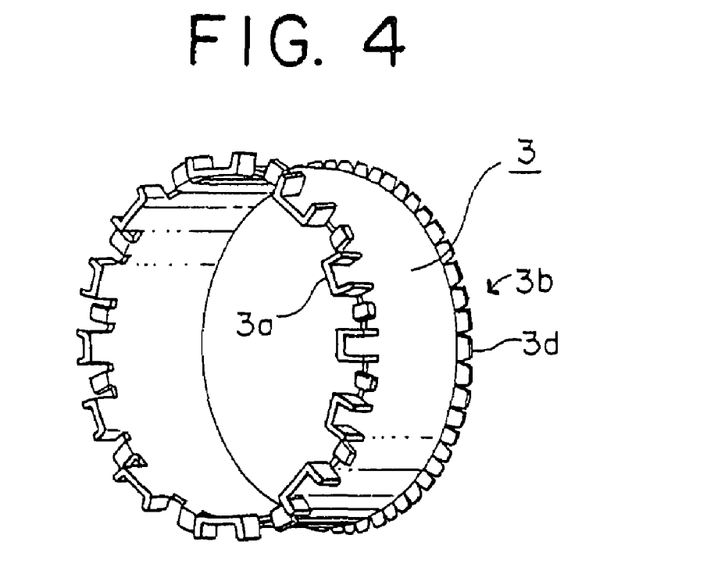
FIG. 4 is a perspective view showing a guard ring of a rotor employed in a magneto-generator according to a second embodiment of the present invention.

FIG. 4 is a perspective view showing a guard ring of a rotor employed in the magneto-generator according to a second embodiment of the present invention. In the guard ring according to the instant embodiment, the discontinuous flange portion 3b is provided with a plurality of cutouts 3d in the circumferential direction. These cutouts 3d can be formed previously when the guard ring 3 is formed by punching a steel sheet into a predetermined shape by means of a pressing machine. More specifically, each of the cutouts 3d is so formed as to extend linearly from the outer peripheral edge of the flange toward the inner peripheral edge thereof. By forming the cutouts 3d in this manner, the discontinuous flange portion 3b is protected from deformation such as bending at an angle greater than 90 degrees, corrugation and the like when the guard ring 3 is rounded into the cylindrical shape. Of course, the guard ring 3 serves for positioning the magnets 2 in the radial direction with the outer peripheral surface thereof while the positioning of the magnets 2 in the rotational axis direction (i.e., axial direction of the rotatable shaft) is properly realized through cooperation of the retaining portions 3a and the discontinuous flange portion 3b which cooperate to sandwich the magnets 2 therebetween, as described hereinbefore in conjunction with the conventional magneto-generator.

In the magneto-generator described above, the guard ring can be implemented in a reduced thickness without bringing about substantially any appreciable deformation of the discontinuous flange portion, which suppresses lowering of efficiency of the electricity generation. Thus, there can be obtained the magneto-generator which can ensure enhanced efficiency for the generation of electricity.

Embodiment 3

Figure 5:
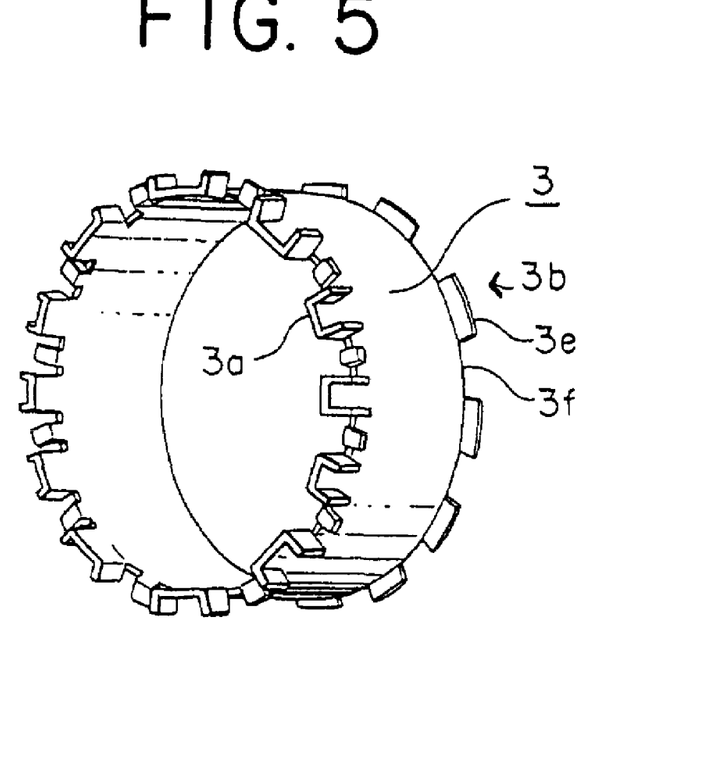
FIG. 5 is a perspective view showing schematically a guard ring of a rotor employed in a magneto-generator according to a third embodiment of the present invention.

FIG. 5 is a perspective view showing schematically a guard ring of a rotor employed in the magneto-generator according to a third embodiment of the present invention. In the guard ring according to the instant embodiment of the invention, the discontinuous flange portion 3b is formed with alternate series of flange sections 3e in each of which a flange section is formed and non-flange sections 3f in each of which the flange is absent. The flange sections 3e and the non-flange sections 3f are formed previously when the guard ring 3 is formed by punching a steel sheet into a predetermined shape to be imparted to the guard ring 3 with the aid of an appropriate pressing machine. With the structure of the guard ring 3 in which the flange sections 3e and the non-flange sections 3f are formed alternately, the discontinuous flange portion 3b is protected from deformation such as bending at an angle greater than 90 degrees, corrugation and the like when the guard ring 3 is rounded into the cylindrical shape. Of course, the guard ring 3 serves for positioning the magnets 2 in the radial direction with the outer peripheral surface thereof with the positioning of the magnets 2 in the rotational axis direction being properly realized through cooperation of the retaining portions 3a and the discontinuous flange portion 3b which cooperate to sandwich the magnets 2 therebetween, as described hereinbefore in conjunction with the conventional magneto-generator.

In the magneto-generator described above, the guard ring can be implemented in a reduced thickness without bringing about substantially any appreciable deformation of the discontinuous flange portion. Further, lowering of efficiency of the generation of electricity can effectively be suppressed. Thus, there is realized the magneto-generator while can enjoy enhanced efficiency of electricity generation.

Embodiment 4

Figure 6:
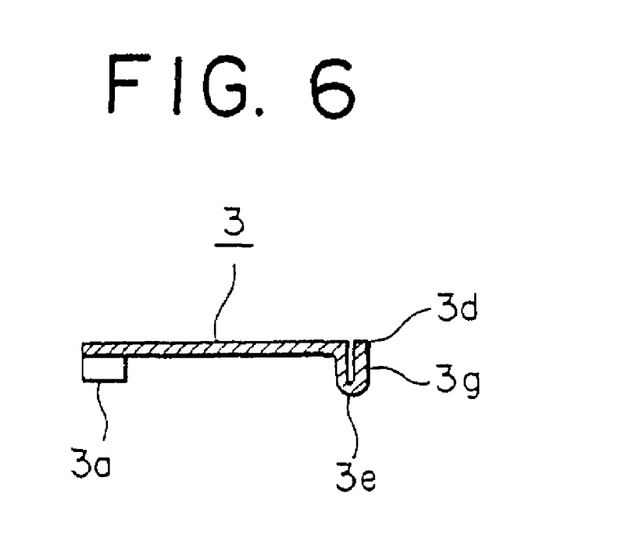
FIG. 6 is a view showing partially in section a guard ring which is incorporated in a magneto-generator according to a fourth embodiment of the present invention.

FIG. 6 is a view showing partially in section a guard ring which is incorporated in the magneto-generator according to a fourth embodiment of the present invention. The cutouts 3d according to the instant embodiment of the invention is substantially similar to that described above in conjunction with the third embodiment of the invention except that each of the flange sections 3e is folded in two layers to thereby form a laminated flange segment 3g. Incidentally, the laminated flange segments 3g may be formed in precedence to rounding of the guard ring 3 into the cylindrical shape.

In the magneto-generator of the structure described above, the discontinuous flange portion 3b is protected from deformation such as bending at an angle greater than 90 degrees, corrugation and the like when the guard ring 3 is rounded into the cylindrical shape. Besides, the cutouts 3d can be imparted with a predetermined mechanical strength notwithstanding of thin structurization of the guard ring 3. Furthermore, the positioning of the magnets 2 in the rotational axis direction can properly be realized through cooperation of the retaining portion 3a and the discontinuous flange portion 3b which sandwiches the magnets 2 therebetween, as described hereinbefore.

At this juncture, it should be added that the laminated flange segments 3g according to the instant embodiment of the invention may equally be adopted in the structure of the magneto-generator according to the first or second embodiment of the present invention.

EFFECTS OF THE INVENTION

The present invention has provided the magneto-generator which includes the flywheel implemented substantially in the bowl-like shape, a plurality of magnets disposed on and along the inner peripheral surface of the flywheel and the guard ring formed substantially in the cylindrical shape and disposed in intimate contact with the plurality of magnets at inner side surfaces thereof. The guard ring is provided with the retaining portions formed in the opened peripheral edge portion thereof located at the bottom side of the flywheel and the discontinuous flange portion formed discontinuously in the opened peripheral edge portion located at the side opposite to the retaining portions. The magnets are positioned in the radial direction with the outer peripheral surface of the guard ring while being positioned in the rotational axis direction as sandwiched between the retaining portions and the discontinuous flange portion. The resin is filled between the flywheel and the guard ring around each of the magnets for securing fixedly the magnets integrally with the flywheel. The magneto-generator further includes the generator coil disposed internally of the flywheel in opposition to the magnets for generating electricity under the action of electromagnetic induction taking place between the magnets and the generator coil. By virtue of the structure of the magneto-generator described above, deformation of the guard ring formed in a reduced thickness can be suppressed owing to the provision of the discontinuous flange portion. The magnets can be mounted and positioned at the respective proper portions. Besides, since the guard ring can be implemented in a thinner structure when compared with the conventional magneto-generator, the air gap between the annular magnet array and the generator coil can be decreased, as a result of which the magnetic fluxes can run through the iron core of the generator coil with high efficiency, which in turn means that the magneto-generator can ensure enhanced efficiency for the generation of electricity.

In the magneto-generator described above, the discontinuous flange portion can be provided with a plurality of notches substantially equidistantly in the circumferential direction. With this arrangement, the guard ring can be implemented in a thin structure without incurring deformation of the flange. Further, since the air gap defined between the thin guard ring and the magnet array can be reduced, the magnetic flux leakage can effectively be suppressed. Thus, the magnetic fluxes can run through the iron core of the generator coil with high efficiency, which in turn means that the magneto-generator can enjoy enhanced efficiency for the generation of electricity.

In the magneto-generator described above, the discontinuous flange portion can be provided with a plurality of cutouts discretely in the circumferential direction. With this arrangement, the guard ring can be implemented in a thin structure without incurring deformation of the flange while efficiency of the electricity generation of the magneto-generator can be prevented from degradation. Thus, the magneto-generator capable of generating electricity with high efficiency can be realized.

Further, in the magneto-generator described above, the discontinuous flange portion can be formed with the flange sections and the non-flange sections alternately in the circumferential direction. With this arrangement, the guard ring can be implemented in a thin structure without incurring deformation of the flange while lowering of efficiency of the electricity generation of the magneto-generator can be suppressed. Thus, the magneto-generator capable of generating electricity with high efficiency can be realized.

Moreover, in the magneto-generator described above, the flange sections can include the laminated flange segments each of which is formed by folding the flange segment forming the flange section into a laminated state as viewed in the direction axially of the magneto-generator. Owing to this structure of the discontinuous flange portion, the guard ring implemented in a thin structure is imparted with sufficient mechanical strength for positioning properly the magnets in the rotational axis direction by sandwiching them between the retaining portions and the discontinuous flange portion.

Many modifications and variations of the present invention are possible in the light of the above techniques. It is therefore to be understood that within the scope of the appended claims, the invention may be practiced otherwise than as specifically described.

What is claimed is:

1. A magneto-generator, comprising:
a flywheel implemented substantially in a bowl-like shape;
a plurality of magnets disposed on and along an inner peripheral surface of said flywheel;
a guard ring formed substantially in a smooth, continuous cylindrical shape and disposed in intimate contact with said plurality of magnets at inner side surfaces thereof, said guard ring being provided with retaining portions formed in an opened peripheral edge portion of said guard ring located at a bottom side of said flywheel and a discontinuous flange portion formed of a series of circumferentially spaced flange sections wherein each of said flange sections includes a folded flange segment that has two layers in a laminated state in a direction axially of said magneto-generator, in an opened peripheral edge portion at a side opposite to said retaining portions for thereby positioning said magnets in a radial direction with the smooth outer peripheral surface of said guard ring while positioning said magnets in a rotational axis direction by sandwiching said magnets between said retaining portions and said discontinuous flange portion; and a mass of resin filled between said flywheel and said guard ring around each of said magnets for securing fixedly said magnets integrally with said flywheel.

2. A magneto-generator, comprising:

a flywheel having a bottom, a side wall extending from said bottom, and an open end defined by said side wall;

a plurality of magnets disposed on an inner peripheral surface of said side wall; and a guard ring in contact with inner side surfaces of said magnets, said guard ring having (1) a first opened edge portion located at said bottom of said flywheel, (2) retaining portions formed in said first opened edge portion, (3) a second opened edge portion located at said open end of said flywheel, (4) a smoothly cylindrical central portion between said edge portions, and (5) a discontinuous flange portion formed of a series of circumferentially spaced flange sections wherein each of said flange sections includes a folded flange segment that has two layers in a laminated state in a direction axially of said magneto-generator, in said second opened edge portion, wherein said magnets are provided between said retaining portions and said discontinuous flange portion.

* * * * *